(12) United States Patent
Woo

(10) Patent No.: US 6,250,660 B1
(45) Date of Patent: Jun. 26, 2001

(54) CAMBER ANGLE CONTROL SUSPENSION SYSTEM

(75) Inventor: Seung-Hoon Woo, Kunpo (KR)

(73) Assignees: Hyundai Motor Company, Seoul (KR); Kia Motors Corporation, Kyungki-do (KR)

(*) Notice: Subject to any disclaimer, the term of this patent is extended or adjusted under 35 U.S.C. 154(b) by 0 days.

(21) Appl. No.: 09/578,077

(22) Filed: May 23, 2000

(30) Foreign Application Priority Data

Nov. 25, 1999 (KR) .................................................. 99-52741

(51) Int. Cl.[7] .................................................. B60G 15/07
(52) U.S. Cl. .......................... 280/124.149; 280/124.152; 280/124.167
(58) Field of Search ..................... 280/124.106, 124.128, 280/124.134, 124.149, 124.153, 124.166, 124.167, 86.751

(56) References Cited

U.S. PATENT DOCUMENTS

| | | | |
|---|---|---|---|
| 3,086,793 | * 4/1963 | Kozicki | 280/104 |
| 3,147,990 | * 9/1964 | Wettstein | 280/104 |
| 3,701,542 | * 10/1972 | Grosseau | 280/124.152 |
| 4,635,958 | * 1/1987 | Yonemoto | 280/664 |
| 4,871,187 | * 10/1989 | Schaible | 280/667 |
| 5,641,175 | * 6/1997 | Meada et al. | 280/664 |
| 5,839,742 | * 11/1998 | Holt | 280/124.134 |
| 5,921,568 | * 7/1999 | Cruise et al. | 280/124.134 |

* cited by examiner

*Primary Examiner*—Paul N. Dickson
*Assistant Examiner*—Faye M. Fleming
(74) *Attorney, Agent, or Firm*—Christie, Parker & Hale, LLP

(57) ABSTRACT

A camber angle control type suspension system including a trailing arm pivotally connected to a vehicle body, a pair of swing arms connected to the vehicle body by means of damping members, and torsion bars for connecting the trailing arm to the swing arms.

5 Claims, 4 Drawing Sheets

CAMBER ANGLE CONTROL SUSPENSION SYSTEM

BACKGROUND OF THE INVENTION (a) Field of the Invention

The present invention relates to a vehicle suspension and, in particular, to a suspension system capable of optimally controlling camber angle regardless of suspension movement without a stabilizer bar.

(b) Description of the Related Art

A suspension system is designed to provide the best combination of ride quality, directional control, ease of handling, safety, stability, and service life. Particularly, the front suspension system makes provision for turning the front wheels both right and left, as well as for straight-ahead directional control. Also, the front suspension system absorbs most of the braking torque caused by weight transfer during braking.

The camber angle of the front wheels has an important relationship with the behavior of the vehicle. Generally, in most suspension system of prior art, the camber angle is zero or very small for ideal contact between the tire and the ground.

However, if a suspension system is designed to have no camber angle while the vehicle is being driven straightforward, camber angle is generated when the vehicle turns, and it varies as the turning radius varies. If the suspension system is designed to have no camber angle during turning of the vehicle, there exists a camber angle when the vehicle runs in a straightforward direction.

FIG. 1 and FIG. 2 are schematic views showing behavior of prior wishbone type and trailing arm type suspensions.

As shown in FIG. 1, the wishbone type and trailing arm type suspension systems 6 and 8 are designed to have no camber angle when the vehicle encounters bumps and is being driven in a straightforward direction, so camber angles are generated when the vehicle turns, and it varies as the turning radius varies.

As shown in FIG. 2, when the suspension systems are designed to have no camber angle during turning of the vehicle, there exists a camber angle when the vehicle bumps and rebounds.

Accordingly, in these prior suspension systems, it is impossible to obtain both straightforward running stability and turning stability with the same front suspension geometry.

SUMMARY OF THE INVENTION

The present invention has been made in an effort to solve the above problems of the prior art.

It is an object of the present invention to provide a camber angle control type suspension system capable of maintaining an ideal contact surface between the tire and the ground regardless of the vehicle's directional condition and road surface condition.

To achieve the above object, a camber angle control type suspension system of a preferred embodiment of the present invention comprises a trailing arm pivotally connected to a vehicle body, a pair of swing arm connected to the vehicle body by means of a damping member, and a torsion bar for connecting the trailing arm to the swing arm.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 3:
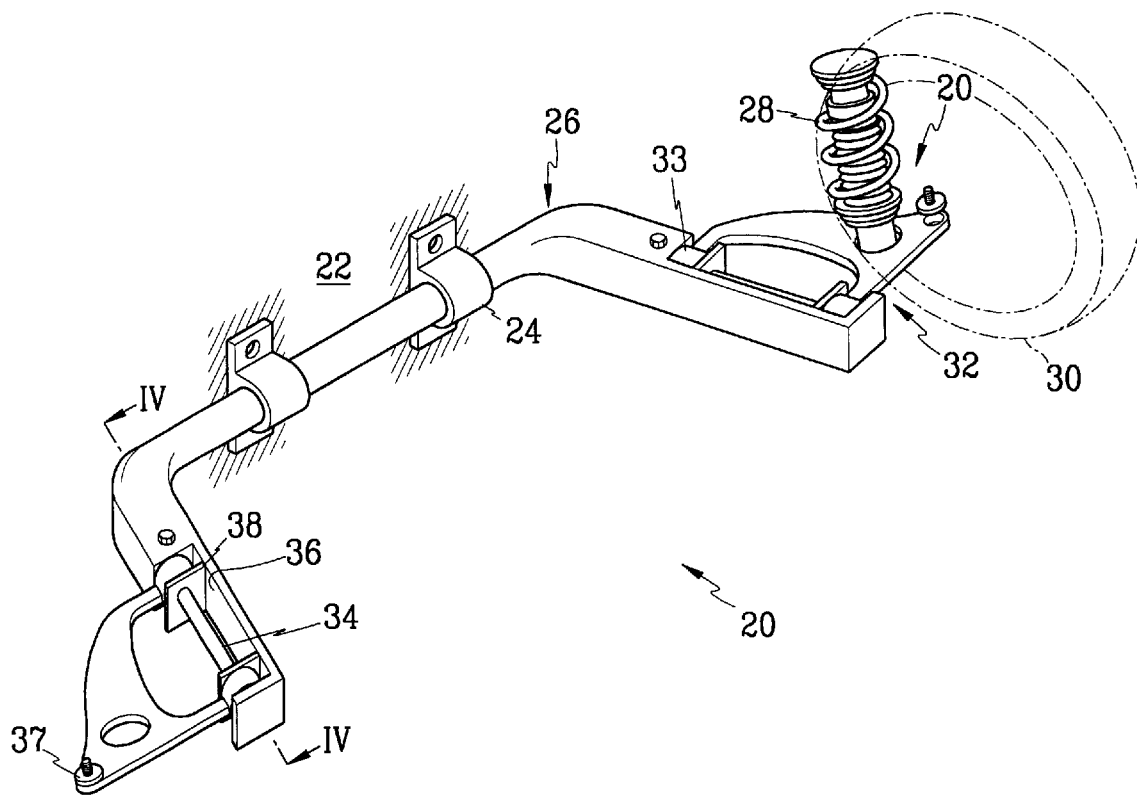
FIG. 3 is a perspective view showing a camber angle control type suspension system according to a preferred embodiment of the present invention.

FIG. 3 is a perspective view showing a camber angle control type suspension system according to a preferred embodiment of the present invention.

As shown in FIG. 3, the camber angle control type suspension system of the present invention comprises a trailing arm 26 having a shape of a U and pivotally mounted to the vehicle body 22 on its central portion by means of rotational joints 24, a pair of swing arms 32, one connected to each end portion of the trailing arm 26, and a pair of torsion bars 34, one interposed between each trailing arm 26 and swing arm 32 so as to connect them to each other.

Since the camber angle control type suspension system of the present invention is symmetric, the left half portion of the suspension system will be described as exemplary.

The trailing arm 26 is provided with a swing arm mounting bay 36 formed on the exterior surface of the end portion of the trailing arm, and a pair of torsion bar supports 38 are formed in the swing arm mounting bay 36, each torsion bar support 38 having a hole through which the torsion bar passes.

Figure 4:
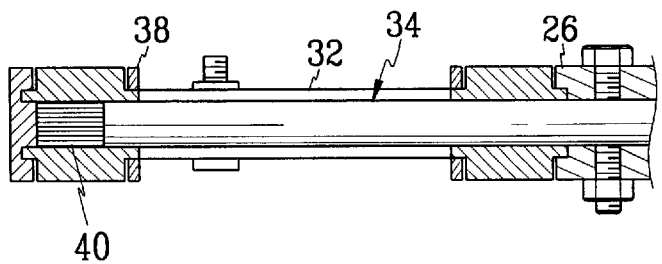
FIG. 4 is a cross-sectional view cut along the line IV—IV of FIG. 3.

The torsion bar 34 is provided with splines around its distal end portion in relation to the center of the trailing arm 26, and is fixed to the trailing arm 26 at its proximal end (see FIG. 4) so as to be supported by the torsion bar supports 38.

The swing arm 32 is provided with two connecting ends 33 formed on the same side, each connecting end 33 having a connecting hole through which the torsion bar 34 passes, and a wheel-mounting end 37 formed on the opposite side, where a wheel 30 is mounted by means of wheel carrier (not shown), and the swing arm 32 is connected to the trailing arm 26 by means of the torsion bar 34.

In particular, one of the connecting ends 33 of the swing arm 32 is fixedly connected to the distal end portion of the torsion bar 34, and the other end is rotationally connected to the proximal end portion of the torsion bar 34.

Figure 1:
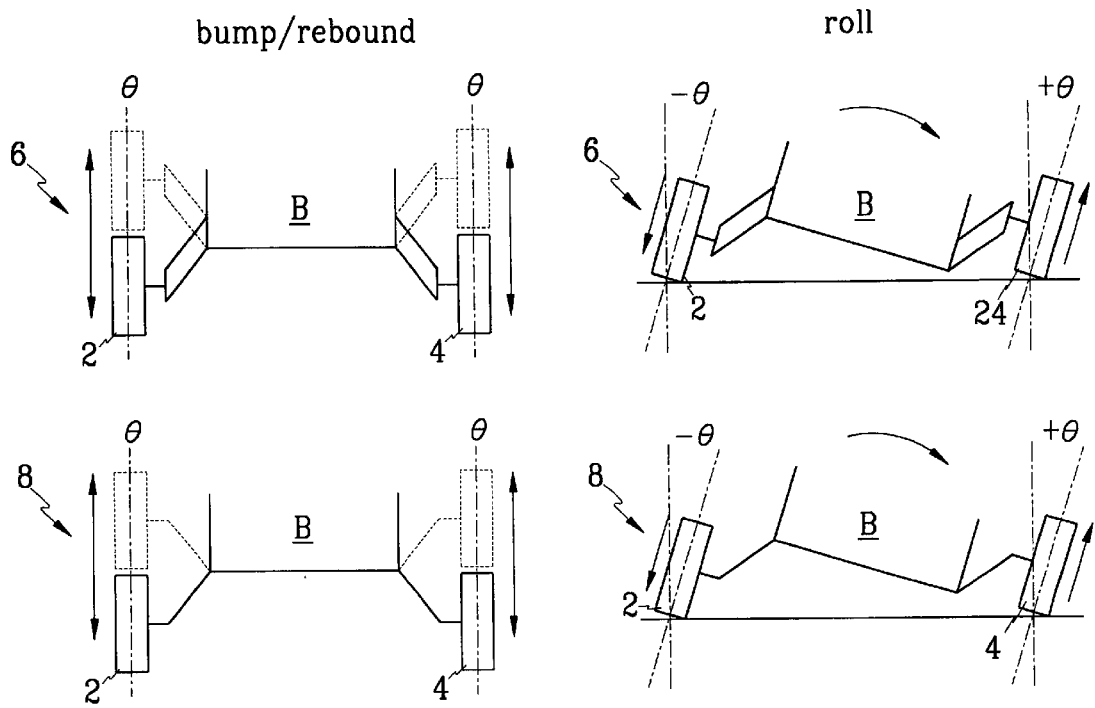
FIG. 1 is a schematic view showing behaviors of a wishbone type and a trailing arm type suspension system designed to maintain zero camber when the vehicle is traveling in a straightforward direction and while bumping and to rebounding.
Figure 2:
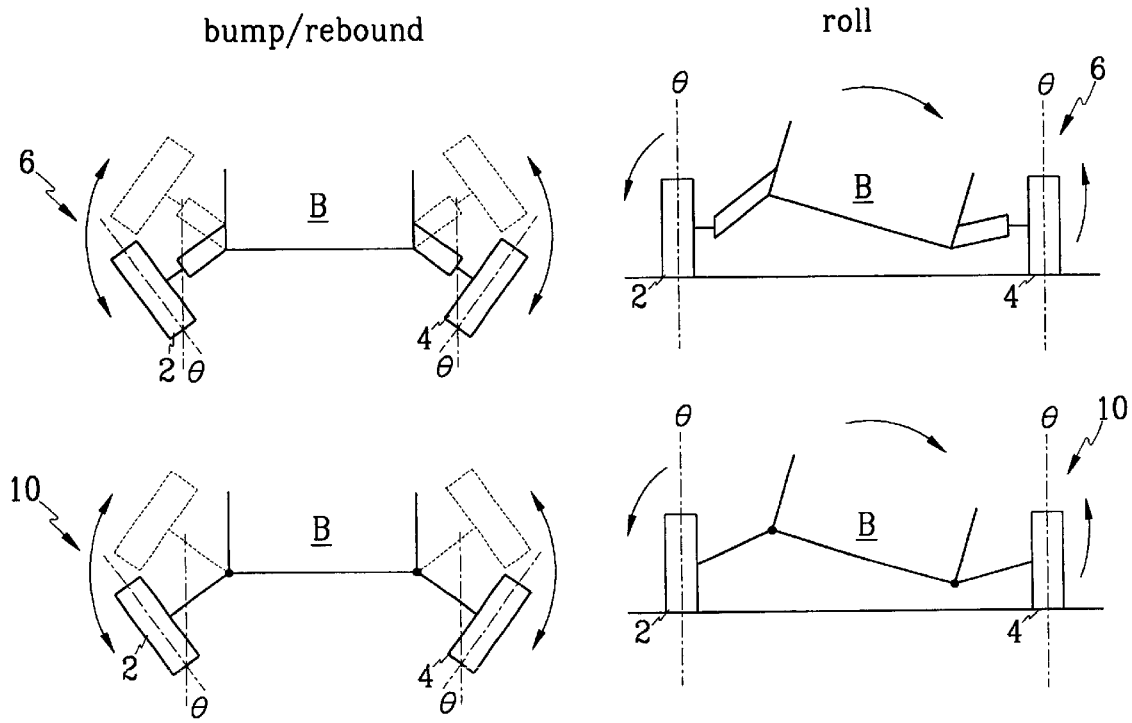
FIG. 2 is a schematic view showing behaviors of a wishbone type and trailing arm type suspension system designed to maintain zero camber while the vehicle turns a corner.
Figure 5:
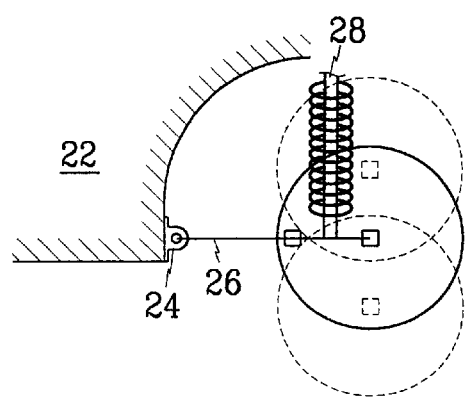
FIG. 5 is a side view showing a camber angle control type suspension system of FIG. 3.

Also, the swing arm is connected to the vehicle body 22 by means of a damping member 20 so as to absorb impacts from a road surface (see FIG. 1 and FIG. 5).

The operation of the camber angle control type suspension system according to the preferred embodiment of the present invention will be described herein after with reference to the accompanying FIG. 6 and FIG. 7.

Figure 6:
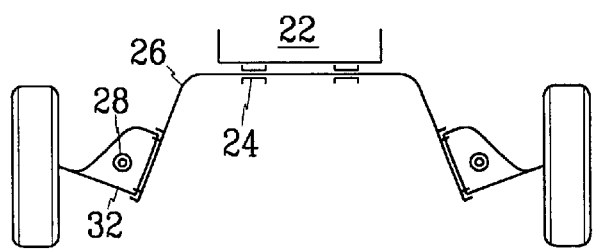
FIG. 6 is a schematic view showing behavior of the camber angle control type suspension system of FIG. 3 while the vehicle equipped with the suspension system is bumping and rebounding.
Figure 6:
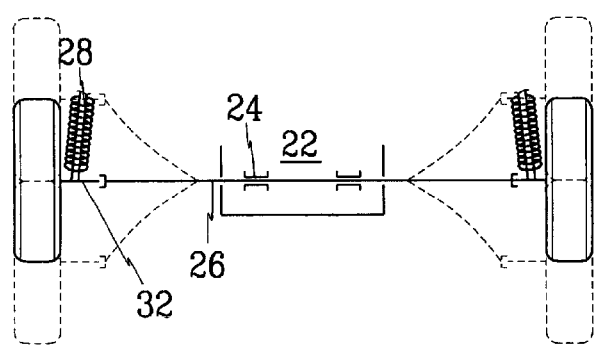
Figure 7:
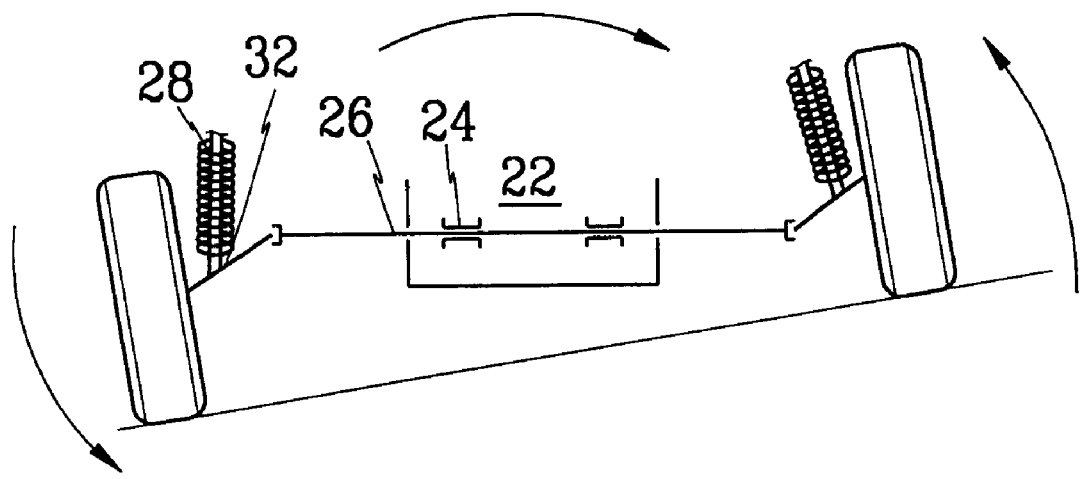
FIG. 7 is a schematic view showing behavior of the camber angle control type suspension system of FIG. 3 while the vehicle is turning.

FIG. 6 and FIG. 7 are schematic views showing respective behaviors of the camber angle control type suspension system of the present invention while the vehicle equipped with the suspension system is bumping and rebounding, and turning.

As shown in FIG. 6, since the trailing arm 26 and the swing arm 32 are connected to each other by means of the torsion bar 34, only the trailing arm 32 pivots up and down on the rotational joints 24 while the vehicle is bumping and rebounding, so the camber angle is maintained at zero. That is, when the vehicle is just bumping and rebounding, the torsion bar 34 does not twist so the trailing arm 26 and swing arm 32 swing integrally.

On the other hand, when the vehicle turns, the torsion bar 34 twists between the trailing arm 26 and the swing arm 32 so as to compensate for the height difference between the left and right wheels 30 such that the camber angle is maintained at zero.

As described above, in the camber angle control type suspension system according to the present invention, the camber angle normally generated by the bump/rebound of the vehicle is prevented by the pivot movement of the trailing arm, and the camber angle normally generated by the turning motion of the vehicle is prevented by the twist movement of the torsion bar such that the camber angle is always zero. This maintains an ideal contact surface between the tire and the ground regardless of the vehicle's directional condition and the unevenness of the road surface so as to prevent the tire from wearing unevenly, and furthermore it improves the vehicle's straightforward running stability and turning stability at the same time.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A camber angle control type suspension system comprising:

a trailing arm pivotally connected to a vehicle body;

a pair of swing arms, each connected to one end portion of the trailing arm for selectively swinging according to wheel displacements; and a pair of torsion bars interposed between the trailing arm and the swing arms for compensating for twisting force generated between the trailing arm and the swing arms.

2. A camber angle control type suspension system of claim 1 wherein the trailing arm has a pair of swing arm mounting bays at each distal end portion, each mounting bay being provided with a pair of supports for supporting the torsion bars.

3. A camber angle control type suspension system of claim 1 wherein the torsion bars have splines around a distal end portion thereof in relation to a center of the trailing arm, and are fixed to the trailing arm at its proximal end.

4. A camber angle control type suspension system of claim 1 wherein the swing arm has two connecting ends formed in the same side and a wheel-mounting end formed in the opposite side.

5. A camber angle control type suspension system of claim 4 wherein one of the two connecting ends is fixedly connected to the torsion bar and the other connecting end is rotationally connected to the torsion bar.

\* \* \* \* \*